United States Patent

Kito et al.

[11] Patent Number: 5,785,746
[45] Date of Patent: Jul. 28, 1998

[54] PREPARATION METHOD FOR SHEAR-THINNING WATER-BASED BALL-POINT PEN INKS COMPOSITIONS AND BALL-POINT PENS EMPLOYING THE SAME

[75] Inventors: Tsutomu Kito, Tajimi; Kuniyuki Senga, Kasugai, both of Japan

[73] Assignee: The Pilot Ink Co., Ltd., Nagoya, Japan

[21] Appl. No.: 794,091

[22] Filed: Feb. 3, 1997

[30] Foreign Application Priority Data

| Feb. 5, 1996 | [JP] | Japan | 8-044119 |
| Feb. 23, 1996 | [JP] | Japan | 8-061757 |
| May 13, 1996 | [JP] | Japan | 8-143620 |

[51] Int. Cl.$^6$ ................................ C09D 11/18
[52] U.S. Cl. ................ 106/31.86; 106/31.59; 106/31.75; 106/31.89; 106/31.58; 401/209
[58] Field of Search .............. 106/31.75, 31.89, 106/31.59, 31.86, 31.58; 401/209

[56] References Cited

U.S. PATENT DOCUMENTS

| 3,941,490 | 3/1976 | Anton | 401/110 |
| 5,013,361 | 5/1991 | Case et al. | 106/31.59 |
| 5,281,262 | 1/1994 | Saito | 106/20 R |

FOREIGN PATENT DOCUMENTS

| 57-49678 | 3/1982 | Japan. |
| 64-8673 | 2/1989 | Japan. |
| 6-256699 | 9/1994 | Japan. |

Primary Examiner—Helene Klemanski
Attorney, Agent, or Firm—Fitzpatrick, Cella, Harper & Scinto

[57] ABSTRACT

A shear-thinning water-based ball-point pen ink composition comprising from 1% by weight to 35% by weight of a colorant, from 2% by weight to 35% by weight of a water-soluble polar solvent, from 1% by weight to 30% by weight of a nonionic surface active agent having an HLB value within the range of from 8 to 12, and the balance being water and adjusting additives, and having a viscosity within the range of from 25 mPa.s to 160 mPa.s (a value at the number of revolution of 100 rpm in an EM type rotational viscometer, 25° C.) and a shear thinning index within the range of from 0.1 to 0.6; the nonionic surface active agent having a mixed phase comprising a phase standing dispersed in the form of fine particles and a phase standing dissolved in a molecular state.

18 Claims, 11 Drawing Sheets

PREPARATION METHOD FOR SHEAR-THINNING WATER-BASED BALL-POINT PEN INKS COMPOSITIONS AND BALL-POINT PENS EMPLOYING THE SAME

BACKGROUND OF THE INVENTION

1. Field of the Invention

This invention relates to a method for preparing a shear-thinning water-based ball-point pen ink, a shear-thinning water-based ball-point pen ink composition, and a ball-point pen making use of the ink composition.

2. Description of the Related Art

As conventional ball-point pen inks, oil-based ball-point pen inks constituted of an oily solvent system, having a viscosity of about 10,000 to 20,000 mPa.s, and water-based ball-point pen inks comprised of an aqueous medium, having a viscosity of about 10 mPa.s., are put into wide use.

Ball-point pens employing the oil-based ball-point pen inks are advantageous in that they require only a relatively simple ball-point pen mechanism in which a tubular ink collector (reservoir) is filled with ink in a liquid-through state without providing any ink flow rate control member, but on the other hand require a high pen pressure because of a heavy writing touch depending on the high viscosity of the ink itself. Also, because of the mechanism in which an ink thin film formed by a highly viscous ink on the ball surface is transferred to a writing surface, the ink tends to cause blurred images, or cause difficulties such as what is called ink blobbing, a phenomenon where ink accumulates at the pen point, and feathering, a phenomenon where ink runs when written in an environment of high outdoor temperature.

As for ball-point pens making use of the water-based ball-point pen inks having a low viscosity, they are advantageous in that a thick writing density can be obtained at a light pen pressure, but on the other hand require an ink flow control means for properly flowing out the ink having a low viscosity. Thus, they can not avoid having a complicated structure constituted of many parts and also tend to cause the phenomenon of feathering or ink dropping during writing, depending on the low viscosity of ink.

Under such circumstances, in recent years, inks of an aqueous medium endowed with thixotropic properties, i.e., what is called shear-thinning water-based ball-point pen ink has been developed and put into practical use.

The ink of this type has a high viscosity when left to stand without application of shear stress and is stably held in the ball-point pen mechanism, and only the ink around the ball becomes low viscous at the time of writing because of the high shear force attributable to the ball that rotates at a high speed, so that the ink smoothly passes through a gap between the ball and a ball holder by capillary action and is transferred to the paper surface. The ink transferred to the paper surface or the like is released from shear force and hence again brought into a highly viscous state, not causing the feathering in writing that has been a disadvantage in conventional non-shear-thinning water-based ball-point pens.

Some proposals concerning the above shear-thinning water-based ball-point pen inks are disclosed. For example, such inks include those utilizing water-dispersible gum, resin, polysaccharide or the like (e.g., U.S. Pat. No. 4,671,691 and Japanese Patent Publication No. 64-8673). Incidentally, the water-dispersible gum, resin, thickening polysaccharide or the like disclosed in these publications tends to undergo change of properties or deterioration because of the action of depolymerization due to microorganisms, the action of decomposition due to photochemical oxidation and the action of molecular chain cleavage due to a strong shear force. Thus, such an ink can not be said to have satisfied the shear thinning effect in a stable and continuous state.

An ink utilizing an organic polymeric compound such as a cross-linkable acrylic resin as an agent for providing shear thinning properties is also disclosed (Japanese Patent Application Laid-open No. 57-49678). Such an ink can exhibit shear thinning properties to a certain extent as properties inherent in the cross-linkable acrylic resin when it is in a highly viscous state. When, however, the ink is used in a writing mechanism of water-based ink ball-point pens, the shear thinning properties can not necessarily be effectively exhibited. More specifically, the shear thinning effect is not sufficient, and the low viscosity appropriate to writing that is produced by shear force at the time of writing and the high viscosity required when stored at the time of non-writing are not necessarily balanced in a satisfactory state.

An attempt to use an inorganic compound such as inorganic fine particles as an agent for providing shear thinning properties is also disclosed (Japanese Patent Application Laid-open No. 6-256699). Fine particles such as fine silicic anhydride (silicon dioxide) particles, though capable of showing shear thinning properties upon moisture absorption, greatly depend on the action attributable to agglomeration force acting between fine particles. Hence, when the ink of this type is applied in ball-point pen inks, it is fairly difficult for three-dimensional structures of agglomerated particles to pass through the narrow gap between the ball and the ball house (ball holder) in a homogeneous state, and hence ink break-off tends to occur. Also, swellable clays such as hydrophilic synthetic smectites may more disperse into finer particles as they are substantially in a molten state and may impart good shear thinning properties at the initial stage. However, they tend to cause a phenomenon where they separate and exude water from the gel itself with time, i.e., the phenomenon of "syneresis", having the disadvantage that the ink may locally separate or the ink column may break in the ball-point pen mechanism.

SUMMARY OF THE INVENTION

An object of the present invention is to provide a method for preparing a shear-thinning water-based ball-point pen ink, a shear-thinning water-based ball-point pen ink composition and a ball-point pen making use of the ink composition, that has eliminated the difficulties involved in conventional ball-point pen inks, can give a smooth writing touch and can satisfy both writing performance and storage performance.

To eliminate the difficulties conventionally involved, the present inventors made extensive studies on water-based ball-point pen inks. As a result, they have discovered that a ball-point pen ink endowed with shear thinning properties effective for water-based ink ball-point pens can be obtained when a specific surface active agent is mixed in an aqueous vehicle, and thus have accomplished the present invention.

The present invention provides a method for preparing a shear-thinning water-based ball-point pen ink, comprising bringing a nonionic surface active agent having an HLB value within the range of from 8 to 12, into presence in an amount of from 1% by weight to 30% by weight in an aqueous vehicle containing a colorant, water and a water-soluble polar solvent, mixing them with stirring so as to be homogeneously mixed to thereby make the aqueous vehicle exhibit shear thinning properties to obtain an ink composition having a viscosity within the range of from 25 mPa.s to 160 mPa.s (a value at the number of revolution of 100 rpm in an EM type rotational viscometer, 25° C.) and a shear thinning index adjusted within the range of from 0.1 to 0.6.

The present invention also provides a shear-thinning water-based ball-point pen ink composition comprising from 1% by weight to 35% by weight of a colorant, from 2% by weight to 35% by weight of a water-soluble polar solvent, from 1% by weight to 30% by weight of a nonionic surface active agent having an HLB value within the range of from 8 to 12, and the balance being water and adjusting additives, and having a viscosity within the range of from 25 mPa.s to 160mPa.s (a value at the number of revolution of 100 rpm in an EM type rotational viscometer, 25° C.) and a shear thinning index within the range of from 0.1 to 0.6; the nonionic surface active agent having a mixed phase comprising a phase standing dispersed in the form of fine particles and a phase standing dissolved in a molecular state.

The present invention still also provides a ball-point pen comprising a nib rotatably holding a ball, and an ink collector from which an ink contained therein is led out for writing, wherein the shear-thinning water-based ball-point pen ink composition described above is held in the ink collector in a liquid-through state without providing any ink flow rate control member.

The above and other objects, features and advantages of the present invention are described in or will become apparent from the following description of the preferred embodiments.

BRIEF DESCRIPTION OF THE DRAWINGS

FIG. 1A is an external view, and FIG. 1B a cross-sectional view.

FIG. 2A is an external view, and FIG. 2B a cross-sectional view.

FIG. 3A is an external view, and FIG. 3B a cross-sectional view.

FIG. 4A is an external view, and FIG. 4B a cross-sectional view.

FIG. 5A is an external view, and FIG. 5B a cross-sectional view.

DESCRIPTION OF THE PREFERRED EMBODIMENTS

Figure 1A:
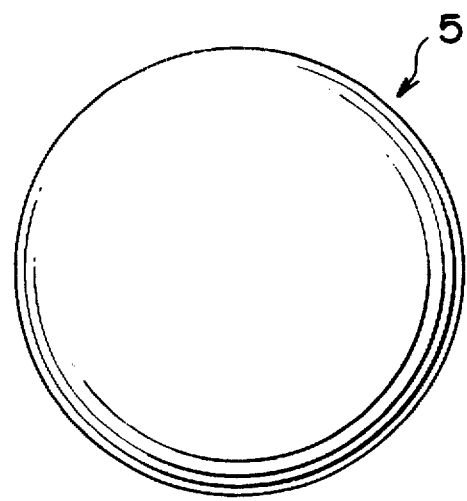
FIGS. 1A and 1B are diagrammatic illustrations of the external shape of an example of a microcapsular pigment material.

The present invention is characterized in that a specific surface active agent is brought into presence and mixed in an aqueous vehicle in a specific quantity to make the aqueous vehicle exhibit shear thinning properties, whereby shear-thinning ink that satisfies suitability and performances required as ball-point pen inks can be obtained.

The shear thinning properties providing agent disclosed in the prior art is a high-molecular weight compound, resin, gum or inorganic particles, whereas, the present invention is based on a discovery that a surface active agent with a specific low molecular weight contributes to effective shear thinning properties. More specifically, the present inventors have discovered that a medium shows shear thinning properties when a nonionic surface active agent having an HLB (hydrophilic-lipophilic balance) value within the range of 8 to 12, i.e., a surface active agent showing a solubility substantially intermediate between oil-soluble and water-soluble is present in the aqueous medium in a concentration not lower than the stated value.

As to the reason why the nonionic surface active agent having an HLB value within the range of 8 to 12, used in the present invention, shows shear thinning properties in the aqueous medium, the present inventors consider as follows.

The nonionic surface active agent having an HLB value within the range of 8 to 12 has properties that are intermediate between lipophilic and hydrophilic. It partly becomes dissolved in the aqueous medium in a molecular state, and partly becomes dispersed in it in the form of fine particles. In appearance, it stands cloudy or semitransparent. In such state of two phases, a dissolved phase and a dispersed phase, the fine particles constituting the dispersed phase function as fixed points and the surrounding dissolved phase as a fluid phase, so that a three-dimensional network structure comprised of the two phases is retained when a low shear force is applied, showing a high viscosity. On the other hand, when a strong shear force is applied, the fluid phase moves with ease and hence the three-dimensional network structure temporarily becomes weak, so that the aqueous medium shows a low viscosity, as so presumed.

The size of particles of the dispersed phase is greatly concerned with the stability of the shear thinning system. The particles must be dispersed in a fine state of a particle size of about 2 μm or smaller. If the particles have a size larger than about 2 μm, the dispersed phase and the dissolved phase tend to become separated into two independent phases. Thus, such a size is not so preferable. The dispersed phase may preferably have a particle size of from 2 μm or smaller up to tens of nm, within the range of which the system can be stable. An aqueous medium containing the nonionic surface active agent having such particle characteristics generally assumes an appearance of from cloudy to semitransparent and to bluish in the order of larger particle size. The ink composition kept in such a physicochemical state effectively promotes the ball rotation of the ball-point pen, and can give an excellent writing touch. It may also cause less wear of the ball seat.

From the viewpoint of temperature dependence stability of the shear thinning system, a nonionic surface active agent that is liquid or pasty at room temperature may be used. This makes it possible to impart superior shear thinning properties having less temperature dependence. Such a nonionic surface active agent has a feature that the hydrophobic group in the hydrocarbon group in the molecule is generally constituted of a branched hydrocarbon group, an unsaturated hydrocarbon group, an aromatic hydrocarbon group or a saturated hydrocarbon group having 12 or less carbon atoms. The exhibition of shear thinning properties in the aqueous medium as in the present invention is presumed to be due to the three-dimensional network structure of the specific surface active agent. Stabler and more effective shear thinning properties can be exhibited when the surface active agent has at least one hydroxyl group in the molecule. Namely, a smaller shear thinning index can be obtained. Such a nonionic surface active agent having at least one hydroxyl group in the molecule can have a stronger and temperature-stabler three-dimensional network structure by the aid of intermolecular interaction attributable to hydrogen bonds, and hence can be especially effective when a low shear thinning index, in other words, high thixotropic properties is/are required. Also, a nonionic surface active agent having at least two hydroxyl groups in the molecule is more preferred. The hydroxyl group may include alcoholic hydroxyl groups, phosphoric acidic hydroxyl groups and phenolic hydroxyl groups.

The nonionic surface active agent used in the present invention is added in an amount of from 1 to 30% by weight in the water-based ball-point pen ink. Its proper quantity may defer depending on individual compounds. It may be used in an amount necessary to appropriately obtain the desired shear thinning properties. If it is used in an amount less than 1% by weight, it is difficult to impart shear thinning properties necessary for the water-based ball-point pen ink. If it is used in an amount more than 30% by weight, the blur in writing tends to occur. The nonionic surface active agent may preferably be added in an amount of from 3 to 15% by weight. Moreover, even in a high shear state, no desired decrease in viscosity may be achieved, making it difficult to attain proper ink flow-out performance that corresponds to writing speed.

So long as the nonionic surface active agent has an HLB value within the range of from 8 to 12, the nonionic surface active agent may be used in combination of a plurality of agents within the amount as defined above.

The nonionic surface active agent used in the present invention is exemplified below. Examples are by no means limited to the following.

In the exemplary compounds, what is indicated as, e.g., "POE(5)" shows that the compound is a compound to which ethylene oxide molecules are added in an amount of 5 mols on the average per substituent. Hence, an instance where the ethylene oxide is added to two substituents means that it is added in an amount of 10 mols as the whole molecules.

As polyglycerol fatty esters, the following may be exemplified.
Hexaglyceryl monomyristate (HLB: 11.0)
Hexaglyceryl monopalmitate (HLB: 10.0)
Hexaglyceryl monostearate (HLB: 9.0)
Hexaglyceryl monooleate (HLB: 9.0)
Decaglyceryl monostearate (HLB: 12.0)
Decaglyceryl monooleate (HLB: 12.0)
Decaglyceryl monolinolate (HLB. 12.0)
Decaglyceryl monoisostearate (HLB: 12.0)
Decaglyceryl diisostearate (HLB: 9.5)
Decaglyceryl dioleate (HLB: 10.0)

In addition to the above exemplary compounds, any polyglycerol fatty esters having an HLB within the range of from 8 to 12 can also be similarly effective.

As ethylene oxide derivatives of glycerol fatty esters, the following may be exemplified.
Glyceryl POE(5) monooleate (HLB: 9.5)
Glyceryl POE(5) monostearate (HLB: 9.5)
Glyceryl POE(10) monostearate (HLB: 11.9)
Glycerol POE(5) beef hard fatty ester (HLB: 9.5)
Glycerol POE(10) beef hard fatty ester (HLB: 11.5)

In addition to the above exemplary compounds, any glycerol fatty esters having an HLB within the range of from 8 to 12 can also be similarly effective.

As polyoxyethylene sorbitol fatty esters, the following may be exemplified.
POE(6) sorbitol tetraoleate (HLB: 8.5)
POE(10) sorbitol tetraoleate (HLB: 9.5)
POE(20) sorbitol tetraoleate (HLB: 10.5)
POE(30) sorbitol tetraoleate (HLB: 11.5)
POE(35) sorbitol tetraoleate (HLB: 12.0)
POE(30) sorbitol tetrastearate (HLB: 11.0)

In addition to the above exemplary compounds, any polyoxyethylene sorbitol fatty esters having an HLB within the range of from 8 to 12 can also be used.

As polyoxyethylene sorbitan fatty esters, the following may be exemplified.
POE(20) sorbitan trioleate (HLB: 11.0)
POE(6) sorbitan monooleate (HLB: 10.0)
POE(20) sorbitan tristearate (HLB: 10.5)
POE(20) sorbitan monostearate (HLB: 9.6)

In addition to the above exemplary compounds, any polyoxyethylene sorbitan fatty esters having an HLB within the range of from 8 to 12 may also be used.

As polyoxyethylene glycol (PEG) fatty esters, the following may be exemplified.
PEG(10) monostearate (HLB: 11.0)
PEG(10) monooleate (HLB: 11.0)
PEG(6) monooleate (HLB: 8.5)

In addition to the above exemplary compounds, any polyoxyethylene glycol fatty esters having an HLB within the range of from 8 to 12 may also be used.

As polyoxyethylene alkyl ethers and polyoxyethylene alkyl phenyl ethers, the following may be exemplified.
POE(2) lauryl ether (HLB: 9.5)
POE(4) lauryl ether (HLB: 11.5)
POE(3) cetyl ether (HLB: 8.0)
POE(5.5) lauryl ether (HLB: 10.5)
POE(7) lauryl ether (HLB: 10.5)
POE(2) stearyl ether (HLB: 8.0)
POE(4) stearyl ether (HLB: 9.0)
POE(7) oleyl ether (HLB: 10.5)
POE(10) behenyl ether (HLB: 10.0)
POE(5) nonyl phenyl ether (HLB: 8.0)
POE(10) octyl phenyl ether (HLB: 11.5)

As polyoxyethylene polyoxypropylene(POP) alkyl ethers, the following may be exemplified.
POE(1),POP(4) cetyl ether (HLB: 9.5)
POE(10),POP(4) cetyl ether (HLB: 10.5)
POE(1),POP(8) cetyl ether (HLB: 9.5)
POE(20),POP(8) cetyl ether (HLB: 12.5)
POE(12),POP(6) tetradecyl ether (HLB: 8.5)
POE(20),POP(6) tetradecyl ether (HLB: 11.5)
POE(30),POP(6) tetradecyl ether (HLB: 12.0)

As fatty acid monoethanol amides, the following may be exemplified.

They may include lauric acid monoethanol amide, myristic acid monoethanol amide, palmitic acid monoethanol amide, stearic acid monoethanol amide, behenic acid monoethanol amide, isostearic acid monoethanol amide, oleic acid monoethanol amide, ricinoleic acid monoethanol amide, and linolic acid monoethanol amide.

As fatty acid diethanol amides, the following may be exemplified.

They may include 1:1 types and 1:2 types of each of lauric acid diethanol amide, myristic acid diethanol amide, palmitic acid diethanol amide, stearic acid diethanol amide, behenic acid diethanol amide, isostearic acid diethanol amide, oleic acid diethanol amide, ricinoleic acid diethanol amide, and linolic acid diethanol amide. Any one of these or two or more ones may be mixed so that the HLB value may be adjusted within the range of from 8 to 12.

As polyoxyethylene fatty acid amides, the following may be exemplified. Here, the numerals in parentheses represent the average number of moles added in the ethylene oxide chain.

They may be exemplified by POE(2-5) lauric acid amide, POE(2-6) myristic acid amide, POE(2-7) palmitic acid amide, POE(2-8) stearic acid amide, POE(2-10) oleic acid amide, POE(2-7) isostearic acid amide, POE(2-7) linolic acid amide, POE(2-7) ricinoleic acid amide, and POE(2-10) behenic acid amide. Any one of these or two or more ones may be mixed so as to be used as a mixture having an HLB value of from 8 to 12. Polyoxyethylene fatty acid amines that are liquid or pasty at room temperature are preferred, which exhibit shear thinning properties having good temperature stability.

The fatty acid amides described above may each be mixed in an amount of from 6 to 30% by weight.

As polyoxyethylene alkyl amines, the following may be exemplified.

They may be exemplified by POE(2-5) laurylamine, POE(2-6) myristylamine, POE(2-7) palmitylamine, POE(2-8) stearylamine, POE(2-10) oleylamine, POE(2-7) isostearylamine, POE(2-7) linolylamine, POE(2-7) ricinoleylamine, and POE(2-10) behenylamine. Any one of these or two or more of these may be mixed so as to be used as a mixture having an HLB value of from 8 to 12. Polyoxyethylene fatty acid amines that are liquid or pasty at room temperature are preferred, which exhibit shear thinning properties having good temperature stability.

As saccharide esters, they include the following.

They may be selected from at least one of compounds formed of mono-, di- and triesters of sucrose in which the carboxylic acid constituting the sucrose ester is comprised of lauric acid, myristic acid, stearic acid, behenic acid, isostearic acid, oleic acid, linolic acid, ricinoleic acid, a beef tallow fatty acid or the like. Sucrose ester single compounds or mixtures having an HLB value within the range of from 8 to 12 may be used.

The sucrose ester compounds are commonly available as DK esters (sucrose esters available from Daiichi Kogyo Seiyaku Co., Ltd.). For example, DK Esters F-110 (HLB: about 11), F-90 (HLB: about 9) and F-70 (HLB: about 8) can preferably exhibit the shear thinning properties.

As phosphoric esters, single compounds or mixtures of monoesters, diesters or triesters of the compounds exemplified below may be used.

They may be exemplified by;
POE(1-2) n-decyl ether phosphate,
POE(1-2) n-undecyl ether phosphate,
POE(1-3) n-dodecyl ether phosphate,
POE(1-3) n-isotridecyl ether phosphate,
POE(1-3) n-myristyl ether phosphate,
POE(1-4) n-cetyl ether phosphate,
POE(1-4) n-stearyl ether phosphate,
POE(1-6) n-behenyl ether phosphate,
POE(1-4) n-isostearyl ether phosphate,
POE(1-4) n-nonyl phenyl ether phosphate,
POE(1-4) n-oleyl ether phosphate,
n-decyl phosphate, n-dodecyl phosphate, n-undecyl phosphate, isotridecyl phosphate, myristyl phosphate, cetyl phosphate, stearyl phosphate, isostearyl phosphate, behenyl phosphate, oleyl phosphate, and nonyl phenyl phosphate.

In addition to the above exemplary compounds, any phosphoric esters having an HLB within the range of from 8 to 12 can also be similarly effective.

In the case of the phosphoric esters, the compounds may be partly neutralized to adjust the pH, using inorganic or organic basic components as occasion calls.

As compounds other than the foregoing, any of nonionic surface active agents such as polyoxyethylene alkylphenyl formaldehyde condensates, polyoxyethylene lanolins, polyoxyethylene lanolin alcohols, polyoxyethylene sorbitol beeswaxes, polyoxyethylene caster oils, polyoxyethylene hardened caster oils and sorbitan fatty esters having an HLB within the range of from 8 to 12 may be used as single compounds or mixtures of two or more compounds.

The ink composition of the present invention contains a colorant. As the colorant, any of dispersible dyes and pigments are all usable. Examples thereof are shown below.

As the dyes, acid dyes such as C.I. Acid Blue, direct dyes such as C.I. Direct Black 154 and basic dyes such as Rhodamine and Methyl Violet may be used. As the pigments, inorganic pigments such as carbon black and ultramarine blue, and organic pigments such as copper phthalocyanine blue and Benzidine Yellow, as well as water-dispersible pigment products having been finely and stably dispersed in an aqueous medium by the use of a surface active agent can be used with ease. For example, they may include C.I. Pigment Blue 15:3B (trade name: S.S. Blue GLL; pigment content: 24%; available from Sanyo Color Works, Ltd.), C.I. Pigment Red 146 (trade name: S.S. Pink FBL; pigment content: 21.5%; available from Sanyo Color Works, Ltd.), C.I. Pigment Yellow 81 (trade name: TC Yellow FG; pigment content: 30%; available from Dainichiseika Color & Chemicals Mfg. Co., Ltd.), and C.I. Pigment Red 220/166 (trade name: TC Red FG; pigment content: 35%; available from Dainichiseika Color & Chemicals Mfg. Co., Ltd.), As fluorescent pigments, synthetic resin fine-particle type fluorescent pigments obtained by solid-solubilizing various fluorescent dyes into resin matrixes may be used. Besides, they may be exemplified by pearl pigments, gold or silver metallic pigments, light-storing pigments, white pigments such as titanium oxide used in correction pens, and perfume or perfume capsular pigments.

The above colorant may be used alone or in the form of a mixture of two or more kinds. The colorant may be used in an amount of from 1 to 35% by weight. Its amount may be appropriately determined in accordance with color forming properties of the pigment itself or purposes for which the ink is used. As a useful example of the application of the pigment, a reversible thermochromic microcapsular pigment material may be used. A water-based ball-point pen ink composition of the present invention in which the reversible thermochromic microcapsular pigment material is used as the colorant will be described here.

The reversible thermochromic microcapsular pigment material is obtained by encapsulating a thermochromic material in the form of fine particles by a known microencapsulation method, or enclosing it into a resin matrix; the thermochromic material being of the type conventionally known, comprised of a homogeneous mutual solution of an electron donating color forming organic compound, an electron accepting compound and a metachromatic temperature adjuster and reversibly capable of color development and color extinguishment upon electron donating-accepting reaction, as disclosed, e.g., in Japanese Patent Publications No. 51-44706, No. 51-44708, No. 52-7764, No. 51-35414 and No. 1-29398, or the one capable of exhibiting great hysteresis characteristics to cause metachromatism and alternately storing and retaining a colored state and a colorless state or both phases of color (A) and color (B) at temperatures ranging between a low-temperature side color change point and a high-temperature side color change point as disclosed in Japanese Patent Publication No. 4-17154 and Japanese Patent Applications Laid-open No. 7-33997 and No. 7-179777.

The reversible thermochromic microcapsular pigment material is brought into presence in a dispersed state in the aqueous medium used in the present invention. The reversible thermochromic microcapsular pigment material is a pigment material obtained by covering with wall films a homogeneous mutual solution essentially consisting of an electron donating color forming organic compound, an electron accepting compound and a metachromatic temperature adjuster, and having such a particle size distribution that capsules with particle diameters ranging from 0.5 μm to 20 μm are held by at least 95% (% by volume). The reversible thermochromic microcapsular pigment material may more preferably be a pigment material comprised of wall films formed by interfacial polymerization or interfacial polycondensation, having concavities at least at some part of outer surfaces and more preferably having such a particle size distribution that capsules with particle diameters ranging from 0.5 μm to 20 μm are held by at least 95% (% by volume). Such a reversible thermochromic microcapsular pigment material may preferably be mixed in the ink composition in an amount of from 5 to 35% by weight (as solid matter), and the ink composition may have a viscosity within the range of from 30 mPa.s to 160 mPa.s (a value at the number of revolution of 100 rpm in an EM type rotational viscometer at 25° C.) and a shear thinning index within the range of from 0.1 to 0.6.

Figure 1B:
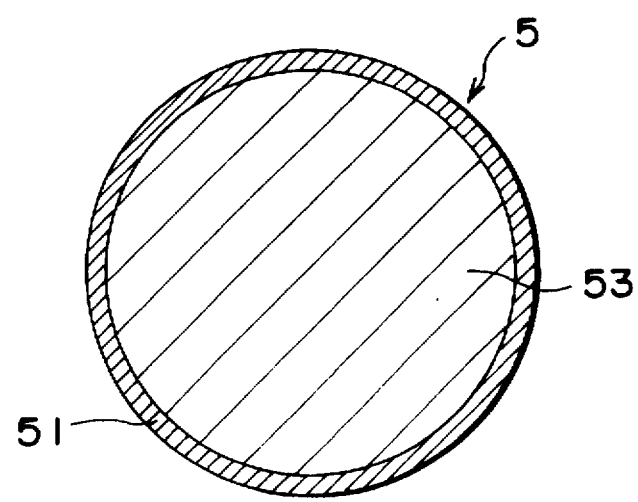
Figure 2A:
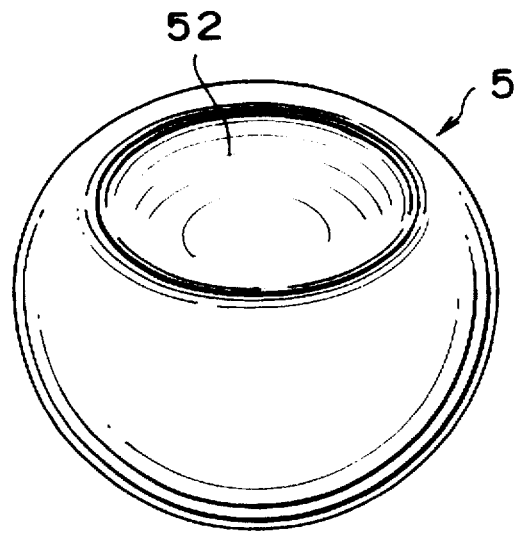
FIGS. 2A and 2B are diagrammatic illustrations of the external shape of another example of a microcapsular pigment material.
Figure 2B:
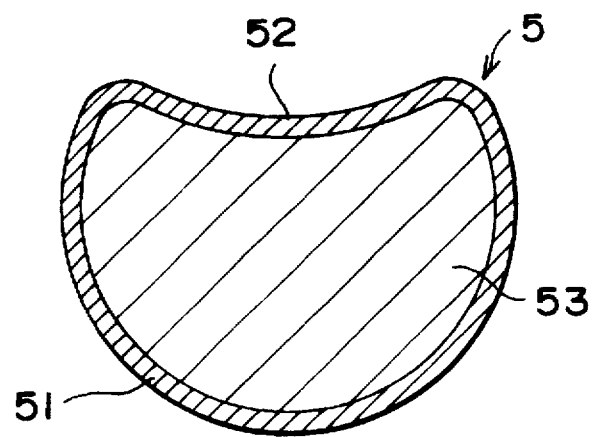
Figure 3A:
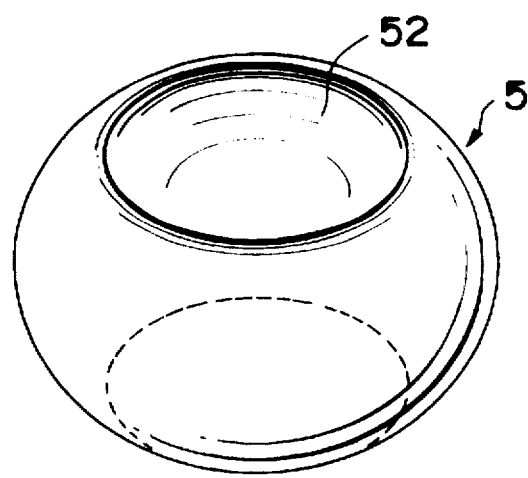
FIGS. 3A and 3B are diagrammatic illustrations of the external shape of still another example of a microcapsular pigment material.
Figure 3B:
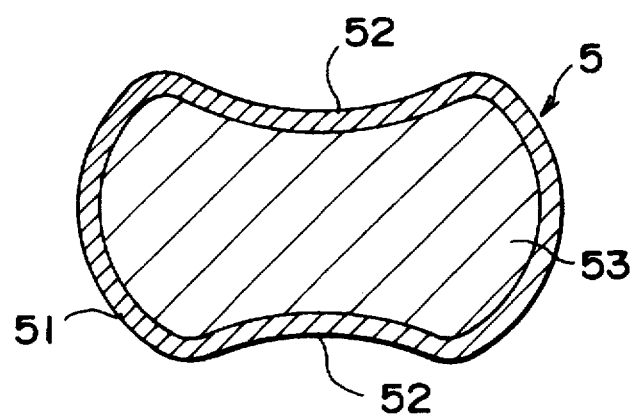
Figure 4A:
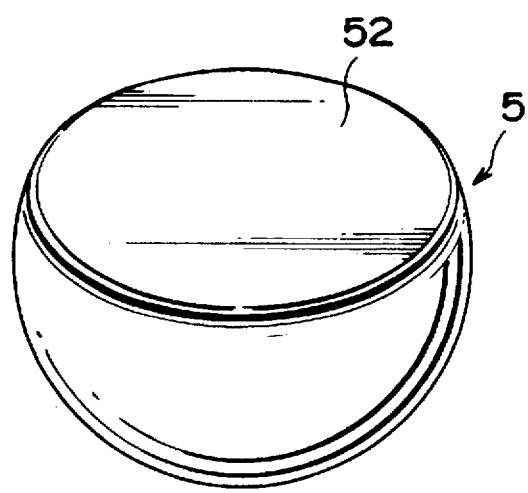
FIGS. 4A and 4B are diagrammatic illustrations of the external shape of still another example of a microcapsular pigment material.
Figure 4B:
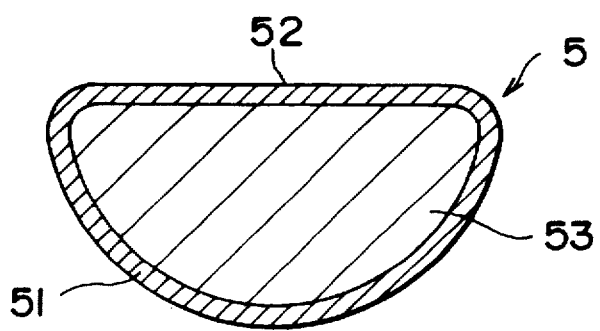
Figure 5A:
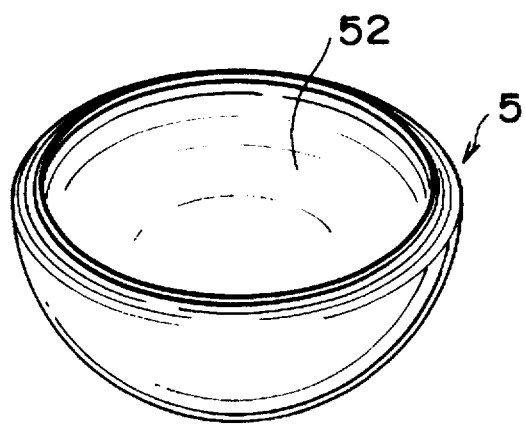
FIGS. 5A and 5B are diagrammatic illustrations of the external shape of still another example of a microcapsular pigment material.
Figure 5B:
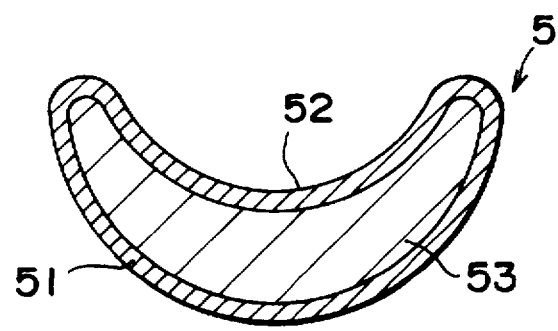

Here, even in the case of an ink having the same viscosity, the microcapsular pigment material having concavities at least at some part of outer surfaces as mentioned above (see FIGS. 2A and 2B to 5A and 5B) can moderate stress when it undergoes an external force (pressure or the like produced at the time of writing), because of its own elastic deformation, compared with a microcapsular pigment material formed of spheres having round cross sections (see FIGS. 1A and 1B). Thus, the capsules themselves are not broken and the ink properly flows out of the ball-point pen nib to impart the desired writing performance.

The ink composition of the present invention uses water as a main solvent. As water-soluble polar solvents, all conventional general-purpose solvents having a solubility in water are also effective, and glycerol, triethanolamine, diethanolamine, monoethanolamine, ethylene glycol, diethylene glycol, thiodiethylene glycol, polyethylene glycol, propylene glycol, ethylene glycol monomethyl ether, ethylene glycol monomethyl ether acetate, sulfolane, 2-pyrrolidone and N-methyl-2-pyrrolidone and so forth may be used. Any of these may be used in an amount of from 2 to 35% by weight in the ink composition.

As adjusting additives, inorganic salts such as sodium carbonate, sodium phosphate and sodium acetate and organic basic compounds such as water-soluble amine compounds may be used as pH adjusters. Benzotriazole, tolyltriazole, dicyclohexylammonium nitrite, diisopropylammonium nitrite, saponin and so forth may be used as rust preventives. As anticeptics or antifungal agents, they may include carbolic acid, sodium salt of 1,2-benzothiazolin-3-one, sodium benzoate, sodium dehydroacetate, potassium sorbate, propyl paraoxybenzoate, and 2,3,5,6-tetrachloro-4-(methylsulfonyl)pyridine. As wetting agents, urea, nonionic surface active agents, sorbitol, mannitol, sucrose, glucose, reduced starch hyrdrolysates, sodium pyrophosphate and so forth may be used. In order to improve permeability of the ink, fluorine type surface active agents or nonionic surface active agents may also be used.

The above adjusting additives are those called conventional additives, and may be appropriately selected from known compounds as occasion calls.

A polymer having substantially no shear thinning properties may also be added as a binder or for the purpose of imparting water resistance. Such a polymer may include linear polymers such as polyvinyl alcohol, polyvinyl pyrrolidone, polyacrylic acid resin and styrene-maleic acid resin. Known resins, gums, thickening polysaccharides and inorganic particles having shear thinning properties may also be used in combination. The shear thinning properties of the ink composition of the present invention are meant to be Theological properties which refer to the properties that a substance is very highly viscous and hardly turns fluid when stands still or undergoes a low stress, and turns low-viscous with an increase in stress to show a good fluidity. The properties also have a meaning common to liquid properties called thixotropic properties or pseudoplasticity.

In the ink composition according to the present invention, the three-dimensional network structure is temporarily broken under application of a high shear stress at the time of writing to cause a decrease in the viscosity of ink, so that the ink in the vicinity of the ball turns into a low viscous ink suited for writing, smoothly passes through a gap between the ball and a ball holder by capillary action and is transferred to the paper surface. At the time of non-writing, all the ink including that in the vicinity of the ball comes to have a high viscosity, so that the ink can be prevented from leaking out or can be prevented from separating and flowing backward. The physical properties of ink can also be stably maintained with time.

Figure 11:
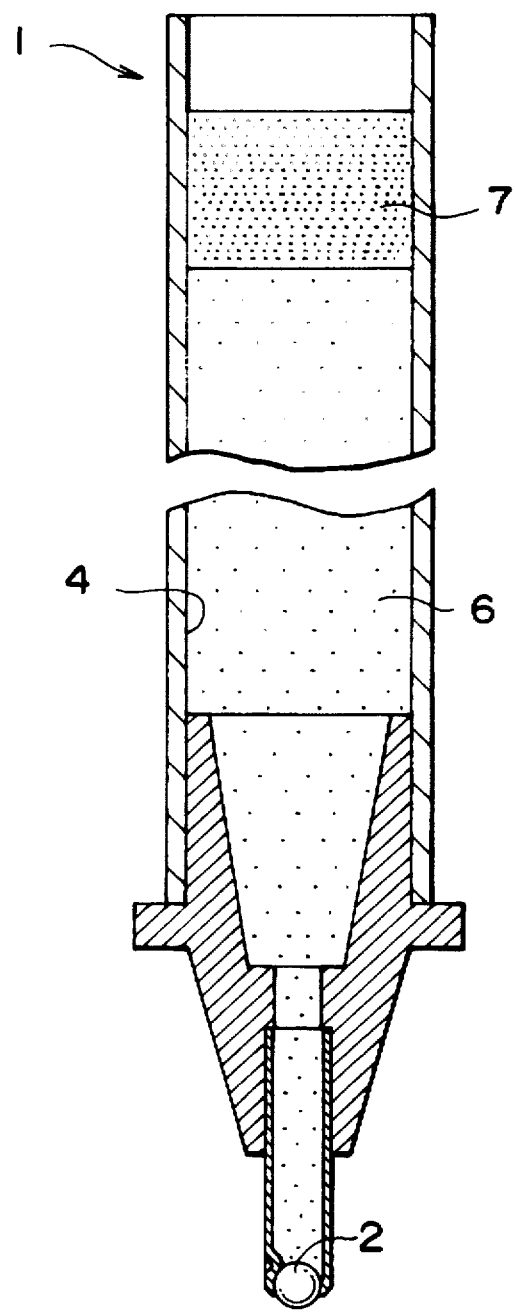
FIG. 11 is a vertically sectional illustration of the ball-point pen according to an embodiment of the present invention.

The ink composition of the present invention can be put into practical use in what is called a liquid-through state, where as shown in FIG. 11 an ink collector 4 of a ball-point pen is directly filled with the ink without providing any ink flow rate control member.

The ball-point pen of the present invention may have a construction widely used in which an ink follower 7 is provided in contact with the rear end of ink 6 which is held in the ink collector 4.

Here, the ink collector 4 may of course be in the form of a pipe, or may be a barrel that constitutes the main body of a writing implement.

Alternatively, the ball-point pen may have a construction in which no ink follower is used, where the ink is held in a flexible collector tube so that the collector tube is appropriately pressed and deformed to control the run of ink.

Figure 6:
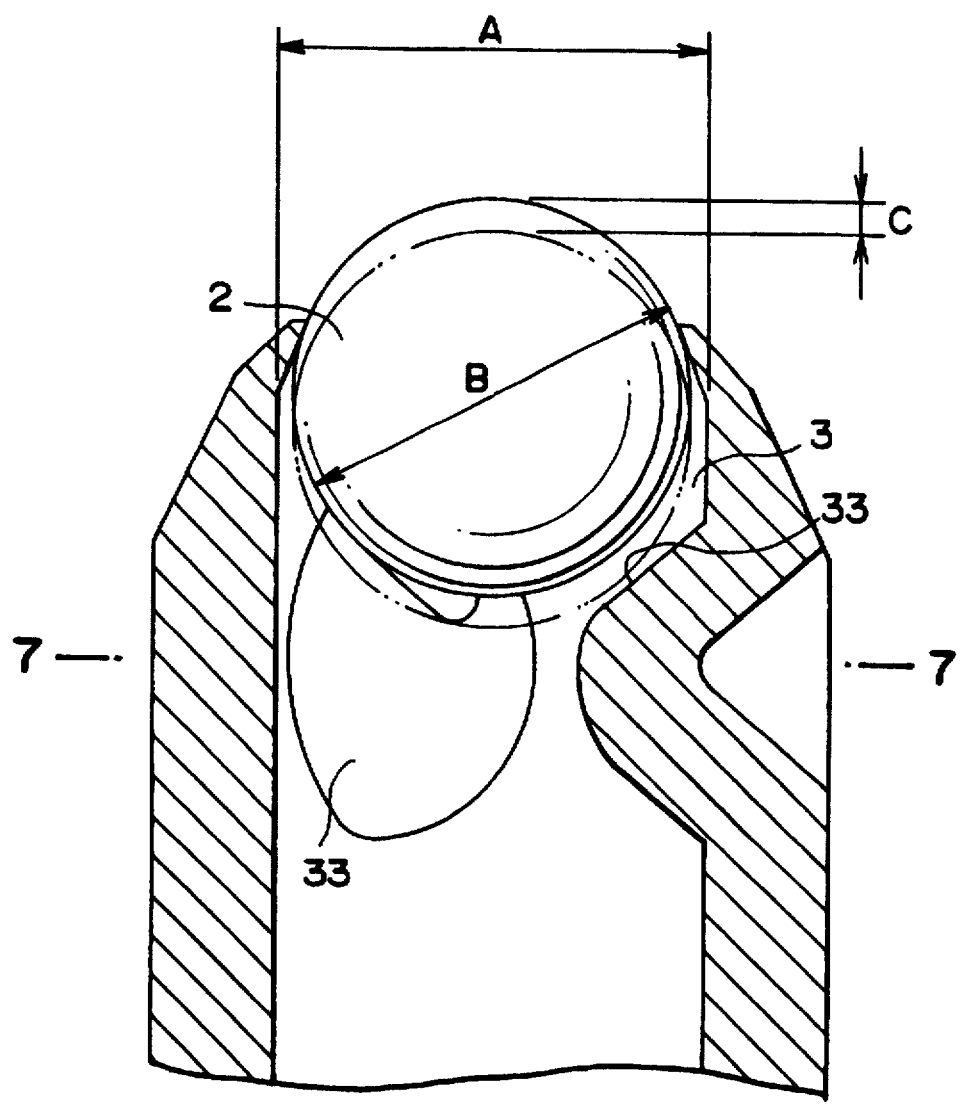
FIG. 6 is a vertically sectional illustration of the nib of the ball-point pen according to an embodiment of the present invention.
Figure 7:
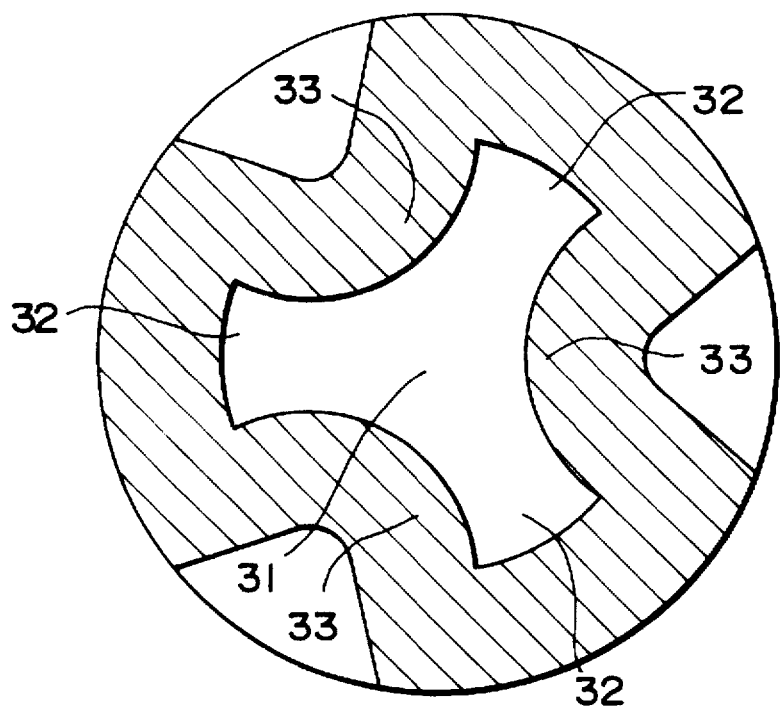
FIG. 7 is a cross section along the line X—X in FIG. 6.
Figure 8:
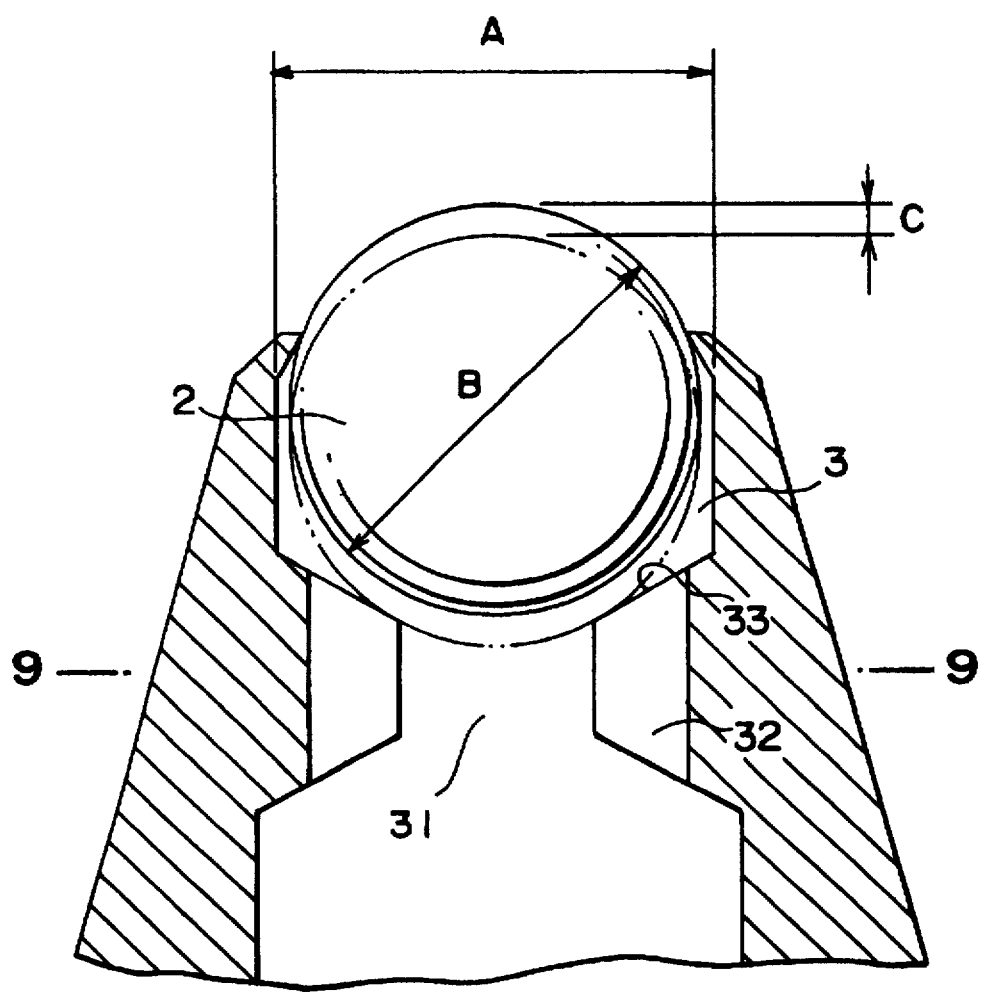
FIG. 8 is a vertically sectional illustration of the nib of the ball-point pen according to another embodiment of the present invention.
Figure 9:
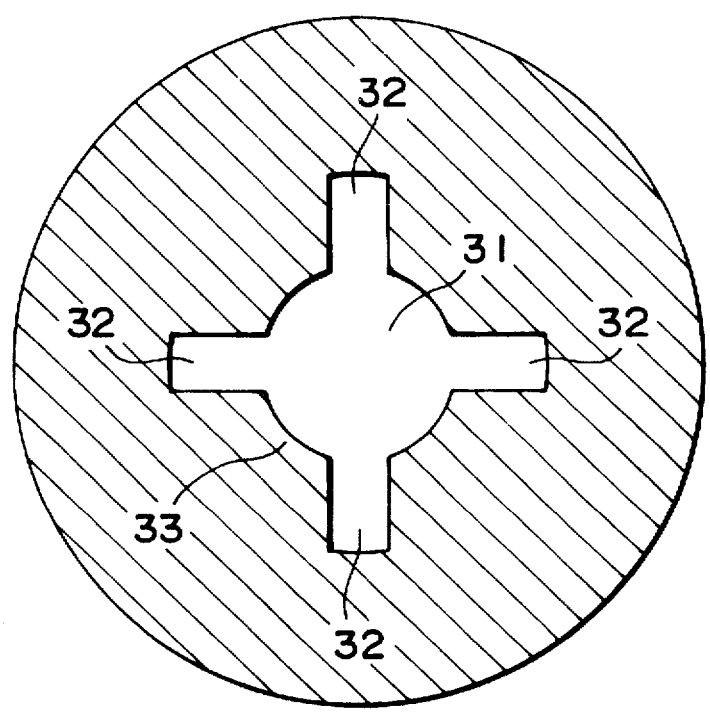
FIG. 9 is a cross section along the line Y—Y in FIG. 8.
Figure 10:
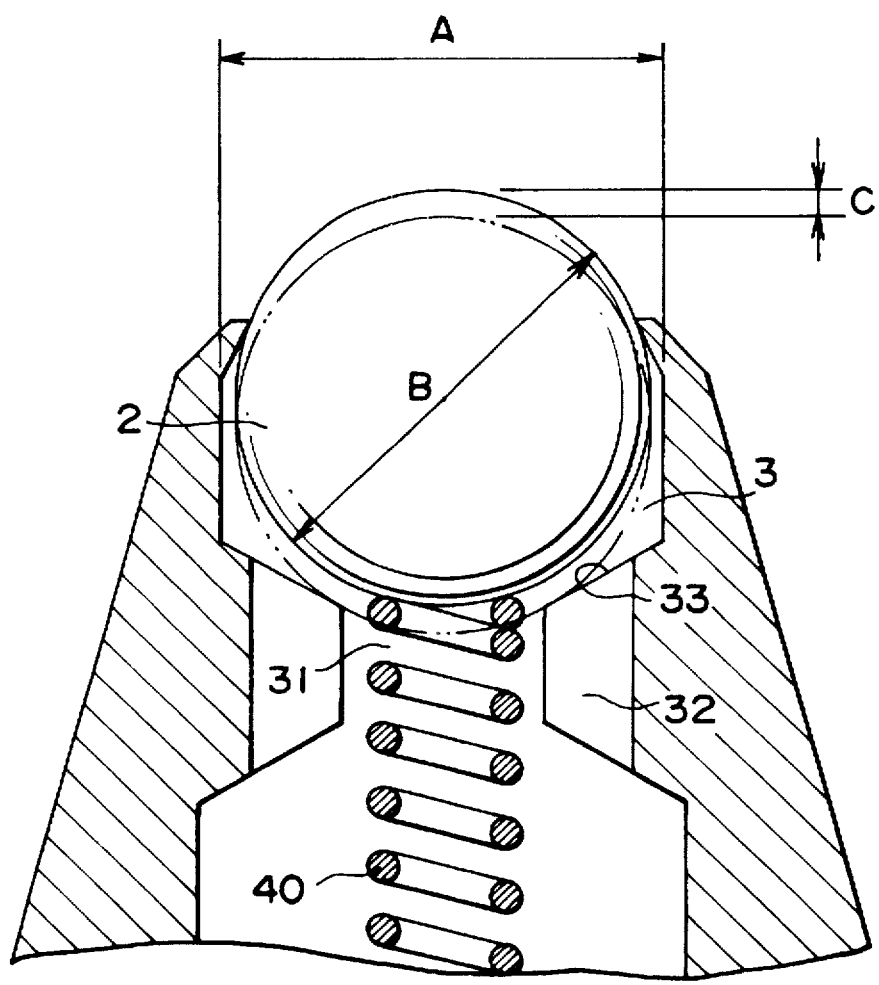
FIG. 10 is a vertically sectional illustration of the nib of the ball-point pen according to still another embodiment of the present invention.

With regard to the structure of the ball-point pen nib, it is effective to use writing or coating instrument having a nib as shown in FIGS. 6 and 7, in which a difference S between inner diameter A of a ball holder 3 and outer diameter B of a ball 2 and a space C within which the ball 2 is movable in the shaft direction can be set in an appropriate range in accordance with the type of ink and the purpose, and the outer surface of a nib mechanism conventionally in wide use, e.g., a metallic pipe is inward pressed and deformed in the vicinity of its top so that the ball seat and the ink lead-out portion are integrally formed; a nib as shown in FIGS. 8 and 9, in which a metal material is cut by means of a drill or the like to form a ball seat 33, a central hole 31 and radial lead-out grooves 3 in the inside; a mechanism as shown in FIG. 10, in which the ball is forward pressed by means of a spring; or a construction in which the ball is rotatably held.

The present invention will be described below in greater detail by giving Examples. The present invention is by no means limited by these Examples.

In the following Examples, the shear thinning index (n) indicates a value n that is calculated according to an experimental expression (T=Kj$^n$; K and n are calculated constants) obtained by rheological measurement of shear stress (T) and shear rate (j) using a viscometer.

In the following Examples, "part(s)" refers to by weight unless particularly noted.

EXAMPLE 1

Black pigment (SS BLACK C, pigment content: 28%; available from Sanyo Color Works, Ltd.) 19.4 parts
Glycerol 3.0 parts
Silicone-modified defoamer 0.1 part
Anticeptic (PROXEL XL-2, trade name; available from Zeneca Co.) 0.1 part
Decaglyceryl diisostearate (NIKKOL DEC2-IS, trade name; available from Nikko Chemicals Co., Ltd.) 12.1 parts
Water 65.3 parts
Total: 100.0 parts
Preparation of ink:

Of the above materials used in the stated amount, the decaglyceryl diisostearate was first dispersed in water with heating. After the dispersion obtained was cooled to room temperature, the black pigment was next added with stirring, followed by addition of the glycerol, the defoamer and the anticeptic. The mixture obtained was suction-filtered using a G3 glass filter to remove coarse matter. Thus an ink composition of the present invention was obtained.

The ink composition obtained had a shear thinning index (n) of 0.41 and a viscosity (100 rpm) of 71 mPa.s (25° C.).
Production of ball-point pen:

A ball with a diameter of 0.5 mm was held in a cut type ball-point pen nib having a difference S of 20 µm between ball holder inner diameter A and ball outer diameter B and a space C of 20 µm within which the ball is movable in the shaft direction. A polypropylene tube with an inner diameter of 3.3 mm was filled with 1.2 g of the above ink composition, and was connected with the above ball-point pen nib through a tube holder made of a resin. Subsequently, a viscoelastic ink follower (a liquid stopper) basically made of polybutene was inserted from the rear end of the polypropylene tube, followed by deaeration by centrifugal treatment. Thereafter, an exterior barrel tube, an inner cap, a connector and an over cap were fitted to obtain a ball-point pen.

Using the ball-point pen thus obtained, images were continuously written on notepaper. As a result, sharp black written images were obtained from the beginning, showing a good writing performance without causing any blurs, line splits, line breaks and ink blobbing.

EXAMPLE 2

Orange fluorescent pigment dispersion (LUMIKOL 2104, trade name; available from Nippon Keiko Kagaku K.K.) 15.0 parts
Glycerol 5.0 parts
Urea 1.0 part
Silicone-modified defoamer 0.1 part
Carbolic acid 0.1 part
Benzotriazole 0.5 part
POE sorbitol tetraoleate (NIKKOL GO-430N, trade name; available from Nikko Chemicals Co., Ltd.) 12.1 parts
Water 66.2 parts
Total: 100.0 parts An ink composition was prepared in the same manner as in Example 1 except for using the above materials. The ink composition obtained had a shear thinning index (n) of 0.20 and a viscosity (100 rpm) of 102 mPa.s (25° C.).
Production of ball-point pen:

A ball-point pen was produced in the same manner as in Example 1 except that a ball with a diameter of 0.7 mm was used and the space C within which the ball is movable in the shaft direction was changed to 50 µm. Using the ball-point pen thus obtained, images were continuously written on notepaper. As a result, sharp blue written images were obtained from the beginning, showing a good writing performance without causing any blurs, line splits, line breaks and ink blobbing.

EXAMPLE 3

Blue pigment dispersion (SS BLUE HB, pigment content: 25%; available from Sanyo Color Works, Ltd.) 15.6 parts
Glycerol 2.6 parts
Urea 1.0 part
Silicone-modified defoamer 0.2 part
Carbolic acid 0.1 part
Benzotriazole 0.5 part
monooleate (NIKKOL HEX 1-0, trade name; available from Nikko Chemicals Co., Ltd.) 11.7 parts
Water 68.3 parts
Total: 100.0 parts An ink composition was prepared in the same manner as in Example 1 except for using the above materials. The ink composition obtained had a shear thinning index (n) of 0.34 and a viscosity (100 rpm) of 61 mPa.s (25° C.).
Production of ball-point pen:

A ball-point pen was assembled in the same manner as in Example 1 except that the ball-point pen nib was replaced with a nib fitted with a stainless steel ball with a diameter of 0.5 mm and of a tube press-deformation type having a difference S of 25 µm between tube inner diameter A and ball outer diameter B and a space C of 20 µm within which the ball is movable in the shaft direction (FIGS. 6 and 7).

Using the ball-point pen thus obtained, images were continuously written on notepaper. As a result, sharp black written images were obtained from the beginning, showing a good writing performance without causing any blurs, line splits, line breaks and ink blobbing.

EXAMPLE 4

Red pigment dispersion (SS RED RR, pigment content: 25%; available from Sanyo Color Works, Ltd.) 26.1 parts
Glycerol 3.3 parts
Urea 3.3 part
Silicone-modified defoamer (DEHYDRAN, trade name, available from Sannopco Limited) 0.1 part
Anticeptic (PROXEL XL-2, trade name; available from Zeneca Co.) 0.2 part
Oxyethylene(2) lauric acid amide [LAD(2), available from Meisei Chemical Works, Ltd.) 8.4 parts
Water 58.6 parts
Total: 100.0 parts An ink composition was prepared in the same manner as in Example 1 except for using the above materials. The ink composition obtained had a shear thinning index (n) of 0.24 and a viscosity (100 rpm) of 65 mPa.s (25° C.).

Production of ball-point pen:

A ball-point pen was assembled using the above ink composition in the same manner as in Example 1. Using the ball-point pen thus obtained, images were continuously written on notepaper. As a result, thick red written images were obtained from the beginning, showing a good writing performance without causing any blurs, line splits, line breaks and ink blobbing.

EXAMPLE 5

Red pigment dispersion (SS RED RR, pigment content: 25%; available from Sanyo Color Works, Ltd.) 16.6 parts
Ethylene glycol 7.2 parts
Silicone-modified defoamer 0.1 part
Anticeptic (PROXEL XL-2, trade name; available from Zeneca Co.) 0.1 part
Polyoxyethylene(5) oleylamine (TAMNO-5, trade name; available from Nikko Chemicals Co., Ltd.) 11.8 parts
Water 64.2 parts
Total: 100.0 parts An ink composition was prepared in the same manner as in Example 1 except for using the above materials. The ink composition obtained had a shear thinning index (n) of 0.48 and a viscosity (100 rpm) of 29 mPa.s (25° C.).

Production of ball-point pen:

A ball-point pen was assembled using the above ink composition in the same manner as in Example 1. Using the ball-point pen thus obtained, images were continuously written on notepaper. As a result, thick red written images were obtained from the beginning, showing a good writing performance without causing any blurs, line splits, line breaks and ink blobbing.

EXAMPLE 6

Aqueous black dye solution (aqueous 20% C.I. Direct Black solution; SS GREEN LXB, dye content: 30%; available from Sanyo Color Works, Ltd.) 19.7 parts
Aqueous 5% sucrose ester solution (DK ester F-90) 56.2 parts
Glycerol 11.2 parts
Urea 2.8 parts
Aqueous 5% sodium borate solution 8.4 parts p0 Silicone-modified defoamer 0.1 part
Anticeptic (PROXEL XL-2, trade name; available from Zeneca Co.) 0.2 part
Permeability-providing agent (SN-WET 366; available from Sannopco Limited) 1.4 parts
Total: 100.0 parts An ink composition was prepared in the same manner as in Example 1 except for using the above materials. The ink composition obtained had a shear thinning index (n) of 0.45 and a viscosity (100 rpm) of 33 mPa.s (25° C.).

Production of ball-point pen:

A ball-point pen was assembled using the above ink composition in the same manner as in Example 1. Using the ball-point pen thus obtained, images were continuously written on notepaper. As a result, thick pink written images were obtained from the beginning, showing a good writing performance without causing any blurs, line splits, line breaks and ink blobbing.

EXAMPLE 7

In the present Example, a thermochromic microcapsular pigment material was prepared in the manner as described below.

A thermochromic composition comprised of 2 parts of 6-(ethylisobutylamino)benzofluoran, 6 parts of bisphenol-A, 30 parts of cetyl alcohol and 20 parts of stearyl capriate, 1 part of TINUVIN 326 (trade name, available from Ciba-Geigy Corp.) as a light-fastness providing agent and also 15 parts of an epoxy resin having an epoxy equivalent weight of 190, obtained by the reaction of bisphenol-A with epichlorohydrin, were uniformly melted with heating, and the molten product obtained was emulsified in 100 parts of an aqueous protective colloid medium previously heated to 70° C. Subsequently, 5 parts of an aliphatic polyamine hardening agent was added, and the mixture obtained was continuously stirred at 90° C. for 5 hours to obtain a microcapsular dispersion by interfacial polymerization. Subsequently, the microcapsular dispersion was centrifuged in order to make concentration to obtain 100 parts of a microcapsular slurry.

The water content of the microcapsular slurry thus obtained was measured to reveal that it was 38%. Next, to examine particle size distribution, the particle size characteristics of microcapsules were measured using a centrifugal sedimentation automatic particle size distribution measuring device (CAPA-300, manufactured by Horiba Seisakusho).

When the particle diameter is represented by D, the microcapsules had the following particle diameters in the following volume percentages.

| Particle diameter range | Volume percentage |
| --- | --- |
| D < 0.5 µm | 3% |
| 0.5 µm ≦ D < 3 µm | 63% |
| 3 µm ≦ D < 5 µm | 20% |
| 5 µm ≦ D < 7 µm | 9% |
| 9 µm ≦ D < 11 µm | 5% |
| 11 µm ≦ D < 13 µm | 0% |
| 13 µm ≦ D < 15 µm | 0% |
| 15 µm ≦ D ≦ 20 µm | 0% |
| 20 µm < D | 0% |

Microcapsules within the range of 0.5 µm≦D≦20 µm was in a volume percentage of 95% in total and had an average particle diameter of 2.7 µm.

The microcapsules obtained were observed using a microscope to confirm that the capsules were hemispherical and flat, having concavities (see FIGS. 2A and 2B to FIGS. 5A and 5B). Also, the larger the particle diameter was, the greater the flatness was.

The thermochromic microcapsular pigment material thus obtained caused metachromatism in magenta at 27° C. or below and turned colorless at 32° C. or above, standing in a transitional stage of metachromatic temperature between the both temperatures.

Using the thermochromic microcapsular pigment material as a colorant, a water-based ball-point pen ink composition was prepared in the same manner as in Example 1 under the following formulation.

Thermochromic microcapsular pigment material (solid matter: 65%) 24.8 parts
Glycerol 4.2 parts
Urea 3.7 parts
Silicone-modified defoamer 0.1 part
Anticeptic (PROXEL XL-2, trade name; available from Zeneca Co.) 0.1 part
Hexaglyceryl monooleate (NIKKOL HEX 1-O, trade name; available from Nikko Chemicals Co., Ltd.) 12.4 parts
Water 54.6 parts
Total: 100.0 parts The ink composition obtained had a shear thinning index (n) of 0.35 and a viscosity (100 rpm) of 96 mPa.s (25° C.).

Production of ball-point pen:

A ball-point pen was assembled in the same manner as in Example 1 except that a ball-point pen nib of a tube press-deformation type was used, a stainless steel ball with a diameter of 0.7 mm was used and the ball holding portion was set to have a difference S of 25 μm between tube inner diameter A and ball outer diameter B and a space C of 46 82 m within which the ball is movable in the shaft direction.

Using the ball-point pen thus obtained, images were continuously written on notepaper. As a result, sharp black written images were obtained from the beginning, showing a good writing performance without causing any blurs, line splits, line breaks and ink blobbing. The written images had a magenta color at 27° C. or below and turned colorless at 32° C. or above, and it was confirmed that no deterioration of performance occurred in the written images with time.

EXAMPLE 8

A thermochromic microcapsular pigment material was obtained in the same manner as in Example 7 except that the thermochromic composition used therein was replaced with a thermochromic composition comprised of 2.5 parts of 1-(4-diethylamino-2-ethoxyphenyl)-3-(1-ethyl-2-methylindol-3-yl)-4-azaphthalide, 5 parts of 2,2-bis(4-hydroxyphenyl)hexafluoropropane and 50 parts of isoamyl stearate. The microcapsular slurry thus obtained had a water content 32%, and the thermochromic microcapsular pigment material obtained caused metachromatism in blue at 16° C. or below and turned colorless at 18° C. or above.

Using the thermochromic microcapsular pigment material as a colorant, a water-based ball-point pen ink composition was prepared in the same manner as in Example 1 under the following formulation.

Thermochromic microcapsular pigment material (solid matter: 68%) 24.9 parts
Hexaglyceryl monooleate (NIKKOL HEX 1-O, trade name; available from Nikko Chemicals Co., Ltd.) 3.1 parts
Glycerol 5.0 parts
Urea 2.5 parts
Silicone-modified defoamer 0.1 part
Anticeptic (PROXEL XL-2, trade name; available from Zeneca Co.) 0.1 part
Water 64.3 parts
Total: 100.0 parts The ink composition obtained had a shear thinning index (n) of 0.29 and a viscosity (100 rpm) of 96 mPa.s (25° C.).

Production of ball-point pen:

A ball-point pen was assembled in the same manner as in Example 7.

Using the ball-point pen thus obtained, images were continuously written on notepaper. As a result, sharp blue written images were obtained from the beginning, showing a good writing performance without causing any blurs, line splits, line breaks and ink blobbing. The written images had a blue color at 16° C. or below and turned colorless at 18° C. or above, and it was confirmed that no deterioration of performance occurred in the written images with time.

Comparative Example 1

An ink composition was prepared in the same manner as in Example 2 except that the POE sorbitol tetraoleate (30 EO) was all replaced with water. The ink composition obtained was low viscous and had no shear thinning properties, to greatly cause ink blobbing immediately after a ball-point pen was assembled using it. When images were written, ink blobbing greatly occurred and the pen was found not suitable for writing.

The ink composition obtained had a shear thinning index (n) of 1.00 and a viscosity (100 rpm) of 2 mPa.s (25° C.).

Comparative Example 2

An ink composition was prepared in the same manner as in Example 1 except that the decaglyceryl diisostearate was all replaced with POE sorbitol monooleate (20 EO) (HLB: 15.0) (NIKKOL TO-1O, trade name; available from Nikko Chemicals Co., Ltd.). The ink composition obtained was low viscous and had no shear thinning properties, to greatly cause ink blobbing immediately after a ball-point pen was assembled using it. When images were written, ink blobbing greatly occurred and the pen was found not suitable for writing.

The ink composition obtained had a shear thinning index (n) of 1.00 and a viscosity (100 rpm) of 12 mPa.s (25° C.).

Results of the writing tests and evaluation of stability with time, made on ball-point pens filled with the ink compositions of Examples 1 to 8 and Comparative Examples 1 and 2 are shown in Table 1.

TABLE 1

| | Type of ink | Ink viscosity at 100 rmp (mPa.s) | Shear thinning index (n) | Initial-stage performance | | | | After 2 weeks at 50° C. | | | |
|---|---|---|---|---|---|---|---|---|---|---|---|
| | | | | Writing density stability | Ink leak-out | Ink spot-ting | Line split-ting | Writing density stability | Ink leak-out | Ink blob-bing | Line split-ting |
| Example: | | | | | | | | | | | |
| 1 | Pigment type black ink | 71 | 0.41 | A | A | A | A | A | A | A | A |
| 2 | Fluorescent pigment type orange ink | 102 | 0.20 | A | A | A | B | A | A | A | B |
| 3 | Pigment type blue ink | 61 | 0.34 | A | A | A | A | A | A | A | A |
| 4 | Pigment type red ink | 65 | 0.24 | A | A | A | A | A | A | A | A |
| 5 | Pigment type red ink | 29 | 0.48 | A | A | B | A | A | A | B | A |
| 6 | Dye type black ink | 33 | 0.45 | A | A | A | A | A | A | A | A |
| 7 | Thermochromic microcapsular pigment type ink | 96 | 0.35 | A | A | A | A | A | A | A | A |

TABLE 1-continued

| | Type of ink | Ink viscosity at 100 rmp (mPa.s) | Shear thinning index (n) | Initial-stage performance | | | | After 2 weeks at 50° C. | | | |
|---|---|---|---|---|---|---|---|---|---|---|---|
| | | | | Writing density stability | Ink leak- out | Ink spot- ting | Line split- ting | Writing density stability | Ink leak- out | Ink blob- bing | Line split- ting |
| 8 | Thermochromic microcapsular pigment type ink | 96 | 0.29 | A | A | A | B | A | A | A | B |
| Comparative Example: | | | | | | | | | | | |
| 1 | Pigment type blue ink | 2 | 1.00 | D | D | D | — | Ink separated, not usable | | | |
| 2 | Pigment type blue ink | 12 | 1.00 | D | D | D | — | Ink separated, not usable | | | |

With regard to the test items shown in Table 1, tests were made in the following way.

(1) Writing density stability

Any discontinuity, blurs and density uniformity of written lines were visually observed to make overall evaluation according to the following criteria.
A: Excellent
B: Good
C: Passable
D: Failure (2) Ink leak-out test The pen point of the ball-point pen filled with ink was held downward in the air, and how ink leaked out of the pen point at the time when 1 hour lapsed was visually observed to make evaluation according to the following criteria.
A: No leak.
B: Slightly leaked.
C: Leaked in a little large quantity.
D: Greatly leaked.

(3) Ink blobbing in writing

The ball-point pen was left to stand as it was strongly pressed against paper surface, and the size of spots of ink spreading over the paper surface and the degree of local ink blobbing in actual continuous writing (written in loops) were visually observed to make evaluation according to the following criteria.
A: No blobbing.
B: Slightly occurred.
C: A little greatly occurred.
D: Greatly occurred.

(4) Line splitting

Line splitting is meant to be a state in which written lines look doubled when thick at their boarders and thin at their middles. Written lines were observed with a magnifier to evaluate the state according to the following criteria.
A: No splitting.
B: Slightly seen.
C: A little greatly seen.
D: Greatly seen.

As described above, in the present invention, the specific nonionic surface active agent is mixed in the stated amount to make the ink have specific water-based liquid properties so as to exhibit the desired shear thinning properties. The ink composition obtained satisfies properties suited for ball-point pen inks, can be free from line splitting, blurs and blobbing in writing, has stable viscosity characteristics with time, and satisfies practical performances as water-based ball-point pen inks containing various colorants. As the colorants, pigments and dyes of various types can be used, and hence ball-point pens having a variety in color tones can be provided. Also, in the system where the thermochromic microcapsular pigment material is used as the colorant, convenient ball-point pens that can give thermochromic written images can be provided, promising the spread of new uses. Such applicable uses and advantages attributable thereto will be exemplified below.

(1) Confidential images such as letters and pictures that cause metachromatism at temperature lower than the room temperature can be formed on post cards, Christmas cards, greeting cards and so forth. Thus, the images may be made to come into sight when cooled, so as to be applicable to magical use, or images that can alternately change from color (A) to color (B) may be formed so that the metachromatism may be caused by body temperature or hand temperature.

(2) In the system making use of a thermochromic pigment material capable of forming color only when it is cold, e.g., at a metachromatic temperature of 10° C., or a thermochromic pigment material having hysteresis characteristics in a wide temperature range, images that can not be read at room temperature can be recorded, using the ball-point pen of the present invention as a confidential pen. Thus, the pen can be used to write memos or the like that must be made confidential.

(3) In the system making use of a color memorizable thermochromic pigment material having hysteresis characteristics, the ink can be advantageously used for learning in school or the like, e.g., for questions, tests, drills, blank maps and English translations, where necessary answers or remarks are written and the written information is erased by heating so that again the problems or the like can be engaged in the state completely reset to have neither answers nor memos.

Even in the system where 10° C.-metachromatic written images are formed, the above use can be satisfied, where premium goods can be made up in combination with a metachromatic means employing cold water or ice pieces as a refrigerant.

(4) Messages may be written on the side wall of a container such as a paper cup with a 10° C.-metachromatic thermochromic ink ball-point pen so that the messages come into sight when a cold drink is poured in the cup. Thus, together with convenience, such use is suited for casual goods or fancy goods, which can be effectively used as premium goods.

(5) The ink composition can also be used for temperature indication as if it functions as a thermometer. A set of thermochromic ink ball-point pens having different metachromatic temperature may be provided so that various images are formed to make them function as temperature detectors. Thus, the ink composition of the present invention can be used in not only toys and stationery but also in a variety of industrial fields, e.g., can be conveniently used in temperature control of reaction tanks, temperature control of processing steps, indication for suitable temperature control of low-temperature circulation food, display for preventing overheat due to short of electric code outlets.

(6) In the field of articles of clothing, illustrations or pictures may be drawn on casual wear such as T-shirts with a 30° C.-metachromatic thermochromic ink ball-point pen so that users themselves can design T-shirts capable of causing metachromatism utilizing a temperature difference between the outdoors and the room in the summer season. This can also be applied to gloves, shoes, hats or caps, ski wear and swimming suits.

(7) In the field of sewing, tracing lines may be written with a memory type thermochromic ink ball-point pen to form colored lines, where the tracing lines can be erased after sewing by heating with a smoothing iron or the like to a temperature higher than a high-temperature side trigger.

As an example of memory type metachromatic mechanism in such use, it is effective to use a system in which a thermochromic pigment material having a low-temperature trigger at $-10°$ C. and a high-temperature side trigger at 40° C. is used.

(8) In the field of preventing forgery, genuine things and imitations can be discriminated by cooling or heating. For example, some information may be handwritten with the ball-point pen of the present invention in tickets, merchandize bonds, coupon tickets and so forth on a scale of private concerns or small lots. This can effectively prevent forgery.

If necessary, the metachromatic temperature, the type of metachromatism and the color may be marked by yourself according to the dates and terms. This can be especially effective when used in order to make a short-term identification.

(9) In the field of toys, for example, a design may be written by yourself at some portion of a stuffed doll so that it is warmed by body temperature to enjoy its metachromatism, or the lips, nails or eyelids of a doll may be colored in lip color, manicure color or eye shadow color, respectively, with memory type metachromatic ball-point pens so that two states of "make-up" and "non-make-up" can be repeatedly enjoyed by means of a metachromatic tool utilizing hot water and ice water. Use of a broad-pointed ball-point pen with a ball diameter of 1 mm to 2 mm can be more effective for this purpose.

(10) The ball-point pen of the present invention can be effectively used as a drawing pen for professional designers. Using a memory type thermochromic ink ball-point pen, an outline rough sketch may be made in the color developed state and then a final design or picture may be drawn up using usual picture materials. Thereafter, the rough sketch may be heated to erase its line images

(11) Jigsaw puzzle cut pieces completed as a picture may be partly provided with numbers or symbols so that the positions to be fitted together can be previously recognized, which are written with a thermochromic ink ball-point pen having a metachromatic temperature not higher than room temperature. Thus, when it is difficult to fit the cut pieces together, they may be partly cooled to make the numbers or symbols come into sight so that the positions can be recognized.

(12) Portraits, pictures or the like may be scribbled with a memory type thermochromic ink ball-point pen having a metachromatic temperature of a high temperature of 35° C., which are heated or cooled so that two states of pictures can be enjoyed.

Besides, the ball-point pen of the present invention may be used in combination with usual non-metachromatic ink ball-point pens so that the state of changes can be in more variety.

What is claimed is:

1. A method for preparing a shear-thinning water-based ball-point pen ink which comprises colorant and an aqueous vehicle comprising water and water-soluble polar solvent, comprising:

bringing 1 to 30% by weight of a nonionic surface active agent having an HLB value within the range of from 8 to 12, into presence of the aqueous vehicle;

mixing homogeneously said surface active agent, colorant and aqueous vehicle with stirring thereby obtaining an ink composition having a viscosity within the range of from 25 mPa.s to 160 mPa.s at 100 rpm in an EM type rotational viscometer at 25° C. and having a shear thinning index adjusted within the range of from 0.1 to 0.6.

2. The method according to claim 1, wherein said nonionic surface active agent is in mixed state of a dispersed phase of fine particles having sizes of 2 μm or below and a dissolved phase.

3. The method according to claim 1, wherein said nonionic surface active agent has at least one hydroxyl group.

4. The method according to claim 1, wherein said nonionic surface active agent is liquid or pasty at room temperature and above.

5. The method according to claim 1, wherein said nonionic surface active agent is selected from the group consisting of a polyglycerol fatty ester, an ethylene oxide derivative of glycerol fatty ester, a polyoxyethylene sorbitol fatty ester, a polyoxyethylene sorbitan fatty ester, a polyoxyethylene glycol fatty ester, a polyoxyethylene alkyl ether, a polyoxyethylene alkyl phenyl ether, a polyoxyethylene polyoxypropylene alkyl ether, a fatty acid monoethanol amide, a fatty acid diethanol amide, a polyoxyethylene fatty acid amide, a polyoxyethylene alkyl amine, a saccharide ester, and a phosphoric ester.

6. The method according to claim 1, wherein said colorant is a reversible thermochromic microcapsular pigment material.

7. A shear-thinning water-based ball-point pen ink composition comprising from 1% by weight to 35% by weight of a colorant, from 2% by weight to 35% by weight of a water-soluble polar solvent, from 1% by weight to 30% by weight of a nonionic surface active agent having an HLB value within the range of from 8 to 12, water and adjusting additives, said composition having a viscosity within the range of from 25 mPa.s to 160 mPa.s at 100 rpm in an EM type rotational viscometer, 25° C. and a shear thinning index within the range of from 0.1 to 0.6; wherein said nonionic surface active agent is in a mixed phase comprising a phase standing dispersed in the form of fine particles and a phase standing dissolved in a molecular state.

8. The method according to claim 7, wherein said nonionic surface active agent has at least one hydroxyl group.

9. The method according to claim 7, wherein said nonionic surface active agent is liquid or pasty at room temperature and above.

10. The method according to claim 7, wherein said nonionic surface active agent is selected from the group consisting a polyglycerol fatty ester, an ethylene oxide derivative of glycerol fatty ester, a polyoxyethylene sorbitol fatty ester, a polyoxyethylene sorbitan fatty ester, a polyoxyethylene glycol fatty ester, a polyoxyethylene alkyl ether, a polyoxyethylene alkyl phenyl ether, a polyoxyethylene polyoxypropylene alkyl ether, a fatty acid monoethanol amide, a fatty acid diethanol amide, a polyoxyethylene fatty acid amide, a polyoxyethylene alkyl amine, a saccharide ester, and a phosphoric ester.

11. The method according to claim 7, wherein said colorant is a reversible thermochromic microcapsular pigment material.

12. The ink composition according to claim 7, wherein said colorant is a reversible thermochromic microcapsular pigment material; said pigment material being obtained by microcapsuling a homogeneous mutual solution essentially consisting of an electron donating color forming organic compound, an electron accepting compound and a metachromatic temperature adjuster, and having 95% or more by weight of capsules with particle sizes ranging from 0.5 to 20 μm in diameter.

13. A shear-thinning water-based ball-point pen ink composition comprising from 5% by weight to 35% by weight of a reversible thermochromic microcapsular pigment material in which capsules with particle size ranging from 0.5 to 20 μm in diameter are 95% or more by volume, from 1% by weight to 30% by weight of a nonionic surface active agent having an HLB value within the range of from 8 to 12, from 2% by weight to 35% by weight of a water-soluble polar solvent, water and adjusting additives, and having a viscosity within the range of from 30 mPa.s to 160 mPa.s at 100 rpm in an EM type rotational viscometer at 25° C. and a shear thinning index within the range of from 0.1 to 0.6.

14. The ink composition according to claim 12 or 13, wherein said reversible thermochromic microcapsular pigment material is a pigment material comprised of wall films formed by interfacial polymerizational or interfacial polycondensation, having concavities at the outer surfaces.

15. A ball-point pen comprising:
a nib rotatably holding a ball, and an ink collector from which an ink contained therein is let out for writing, said ink comprising the ink composition according to any one of claims 7 to 13 and being held in the ink collector in a liquid-through state with the proviso that said pen has no ink flow rate control member.

16. The ball-point pen according to claim 15, wherein said ink collector comprises a tube, and an ink follower is provided at the rear end of the shear-thinning water-based ball-point pen ink composition held in the tube.

17. A ball-point pen comprising:
a nib rotatably holding a ball, and an ink collector from which an ink contained therein is let out for writing, said ink comprising the ink composition according to claim 14 and being held in the ink collector in a liquid-through state with the proviso that said pen has no ink flow rate control member.

18. The ball-point pen according to claim 17, wherein said ink collector comprises a tube, and an ink follower is provided at the rear end of the shear-thinning water-based ball-point pen ink composition held in the tube.

* * * * *

UNITED STATES PATENT AND TRADEMARK OFFICE
CERTIFICATE OF CORRECTION

PATENT NO. : 5,785,746                                                Page 1 of 3
DATED : July 28, 1998
INVENTOR(S) : Kito et al.

It is certified that error appears in the above-identified patent and that said Letters Patent is hereby corrected as shown below:

On the title page, item [56], the following should be inserted:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 2 | 0 | 9 | 7 | 0 | 0 | 7 | 10/82 | Great Britain | | | | |
| | | 1 | 3 | 0 | 1 | 7 | 6 | 0 | 12/89 | Japan | | | | |
| | | 4 | 2 | 7 | 2 | 9 | 6 | 9 | 9/92 | Japan | | | | |
| | | 0 | 1 | 1 | 0 | 1 | 6 | 1 | 6/84 | EPO | | | | |
| | | 0 | 2 | 0 | 9 | 3 | 6 | 7 | 1/87 | EPO | | | | |

Column 3, line 56, "X-X" should read --7-7--.

Column 3, line 6, "Y-Y" should read --9-9--.

UNITED STATES PATENT AND TRADEMARK OFFICE
CERTIFICATE OF CORRECTION

PATENT NO. : 5,785,746
DATED : July 28, 1998
INVENTOR(S) : Kito et al.

It is certified that error appears in the above-identified patent and that said Letters Patent is hereby corrected as shown below:

Please amend claims 8-11 as follows:

8. The [method] <u>ink composition</u> according to claim 7, wherein said nonionic surface active agent has at least one hydroxyl group.

9. The [method] <u>ink composition</u> according to claim 7, wherein said nonionic surface active agent is liquid or pasty at room temperature and above.

10. The [method] <u>ink composition</u> according to claim 7, wherein said nonionic surface active agent is selected from the group consisting of a polyglycerol fatty ester, an ethylene oxide derivative of glycerol fatty ester, a polyoxyethylene sorbitol fatty ester, a polyoxyethylene sorbitan fatty ester, a polyoxyethylene glycol fatty ester, a polyoxyethylene alkyl ether, a polyoxyethylene alkyl phenyl ether, a polyoxyethylene polyoxypropylene alkyl ether, a fatty acid monoethanol amide, a fatty acid diethanol amide, a polyoxyethylene fatty acid amide, a polyoxyethylene alkyl amine, a saccharide ester, and a phosphoric ester.

UNITED STATES PATENT AND TRADEMARK OFFICE
CERTIFICATE OF CORRECTION

PATENT NO. : 5,785,746
DATED : July 28, 1998
INVENTOR(S) : Kito et al.

It is certified that error appears in the above-identified patent and that said Letters Patent is hereby corrected as shown below:

11. The [method] ink composition according to claim 7, wherein said colorant is a reversible thermochromic microcapsular pigment material.

Signed and Sealed this

Sixteenth Day of February, 1999

Attest:

Attesting Officer

Acting Commissioner of Patents and Trademarks

UNITED STATES PATENT AND TRADEMARK OFFICE
CERTIFICATE OF CORRECTION

PATENT NO. : 5,785,746

DATED : July 28, 1998

INVENTOR(S) : TSUTOMU KITO ET AL.

It is certified that error appears in the above-identified patent and that said Letters Patent is hereby corrected as shown below:

COLUMN 2

Line 5, "can not" should read --cannot--.
    Line 16, "can not" should read --cannot--.

COLUMN 8

Line 38, "Ltd.)," should read --Ltd.).--.

COLUMN 10

Line 20, "Theological" should read --rheological--.

COLUMN 11

Line 7, Close up right margin.
    Line 8, Close up left margin.

COLUMN 12

Line 29, "monooleate" should read --Hexaglyceryl monooleate--.

UNITED STATES PATENT AND TRADEMARK OFFICE
CERTIFICATE OF CORRECTION

PATENT NO. : 5,785,746

DATED : July 28, 1998

INVENTOR(S) : TSUTOMU KITO ET AL.

It is certified that error appears in the above-identified patent and that said Letters Patent is hereby corrected as shown below:

COLUMN 13

Line 42, "p0" should be deleted.

COLUMN 15

Line 7, "46 82" should read --46 $\mu$m--.

COLUMN 19

Line 58, "images" should read --images.--.

COLUMN 20

Line 56, "shear thinning" should read --shear-thinning--.

UNITED STATES PATENT AND TRADEMARK OFFICE
CERTIFICATE OF CORRECTION

PATENT NO. : 5,785,746

DATED : July 28, 1998

INVENTOR(S) : TSUTOMU KITO ET AL.

It is certified that error appears in the above-indentified patent and that said Letters Patent is hereby corrected as shown below:

<u>COLUMN 22</u>

Line 2, "shear thinning" should read --shear-thinning--.

Signed and Sealed this

Second Day of November, 1999

Attest:

Q. TODD DICKINSON

Attesting Officer     Acting Commissioner of Patents and Trademarks